United States Patent
Ihm et al.

(10) Patent No.: US 9,497,737 B2
(45) Date of Patent: Nov. 15, 2016

(54) METHOD AND APPARATUS FOR SEARCHING FOR CONTROL CHANNEL IN MULTI-NODE SYSTEM

(71) Applicant: LG ELECTRONICS INC., Seoul (KR)

(72) Inventors: Bin Chul Ihm, Anyang-si (KR); Ki Tae Kim, Anyang-si (KR); Su Nam Kim, Anyang-si (KR); Ji Won Kang, Anyang-si (KR); Jin Young Chun, Anyang-si (KR); Sung Ho Park, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 286 days.

(21) Appl. No.: 14/355,186

(22) PCT Filed: Oct. 30, 2012

(86) PCT No.: PCT/KR2012/008981
§ 371 (c)(1),
(2) Date: Apr. 29, 2014

(87) PCT Pub. No.: WO2013/066020
PCT Pub. Date: May 10, 2013

(65) Prior Publication Data
US 2014/0348092 A1  Nov. 27, 2014

Related U.S. Application Data

(60) Provisional application No. 61/553,268, filed on Oct. 31, 2011.

(51) Int. Cl.
*H04W 72/04* (2009.01)
*H04B 7/26* (2006.01)
(Continued)

(52) U.S. Cl.
CPC .......... *H04W 72/0406* (2013.01); *H04B 7/26* (2013.01); *H04J 11/00* (2013.01); *H04J 11/0079* (2013.01);
(Continued)

(58) Field of Classification Search
CPC ........... H04W 72/0406; H04W 72/042; H04J 11/0079; H04J 11/0086
See application file for complete search history.

(56) References Cited

U.S. PATENT DOCUMENTS

2010/0302983 A1  12/2010  McBeath et al.
2011/0116428 A1*  5/2011  Seong ............... H04L 1/0038
370/311

(Continued)

FOREIGN PATENT DOCUMENTS

KR  10-2009-0033001  4/2009
KR  10-2009-0033126  4/2009

(Continued)

OTHER PUBLICATIONS

Samsung, "Component Carrier Types in Rel-10," 3GPP TSG RAN WG1 #60, R1-101136, Feb. 2010, 4 pages.

(Continued)

*Primary Examiner* — Robert M Morlan
(74) *Attorney, Agent, or Firm* — Lee, Hong, Degerman, Kang & Waimey

(57) ABSTRACT

Provided are a method for searching for a control channel by a user terminal in a multi-node system and a user terminal using the method. The method comprises: setting a first common search space (CSS) and a second CSS, which are distinguishable, in a subframe comprising a plurality of orthogonal frequency division multiplexing (OFDM) symbols; and searching for control information from the first CSS and/or the second CSS, wherein in the first CSS a first piece of control information that is cyclic redundancy check (CRC)-scrambled by a radio network temporary identifier (RNTI) belonging to a first RNTI set is searched, and wherein in the second CSS a second piece of control information that is CRC-scrambled by an RNTI belonging to a second RNTI set is searched.

6 Claims, 17 Drawing Sheets

(51) Int. Cl.
*H04J 11/00* (2006.01)
*H04L 1/00* (2006.01)
*H04L 5/00* (2006.01)
*H04L 25/03* (2006.01)

(52) U.S. Cl.
CPC .......... *H04L 1/0038* (2013.01); *H04L 1/0046* (2013.01); *H04L 1/0061* (2013.01); *H04L 1/0071* (2013.01); *H04L 1/0072* (2013.01); *H04L 5/0053* (2013.01); *H04L 5/0007* (2013.01); *H04L 25/03866* (2013.01)

(56) References Cited

U.S. PATENT DOCUMENTS

| | | | |
|---|---|---|---|
| 2012/0275400 A1* | 11/2012 | Chen | H04J 11/0033 370/329 |
| 2012/0327894 A1* | 12/2012 | Axmon | H04W 48/12 370/330 |

FOREIGN PATENT DOCUMENTS

| | | |
|---|---|---|
| KR | 10-0913473 | 8/2009 |
| WO | 2011120278 A1 | 10/2011 |
| WO | 2011120284 A1 | 10/2011 |

OTHER PUBLICATIONS

CMCC, "Method to decrease blind decoding attempts in common search space," 3GPP TSG RAN WG1 meeting #58bis, R1-094036, Oct. 2009, 4 pages.

Potevio, "Considerations on enhanced downlink control channel design," 3GPP TSG RAN WG1 meeting #66bis, R1-113030, Oct. 2011, 4 pages.

Sharp, "Common Search Space in ePDCCH and fallback operation in Rel-11," 3GPP TSG RAN WG1 Meeting #69, R1-122390, May 2012, 6 pages.

European Patent Office Application Serial No. 12845523.5, Search Report dated Jun. 26, 2015, 12 pages.

PCT International Application No. PCT/KR2012/008981, International Search Report dated Feb. 28, 2013, 4 pages.

\* cited by examiner

METHOD AND APPARATUS FOR SEARCHING FOR CONTROL CHANNEL IN MULTI-NODE SYSTEM

CROSS-REFERENCE TO RELATED APPLICATIONS

This application is the National Stage filing under 35 U.S.C. 371 of International Application No. PCT/KR2012/008981, filed on Oct. 30, 2012, which claims the benefit of U.S. Provisional Application Ser. No. 61/553,268, filed on Oct. 31, 2011, the contents of which are all hereby incorporated by reference herein in their entirety.

BACKGROUND OF THE INVENTION

Field of the Invention

The present invention relates to wireless communication and, more particularly, to a method and apparatus for searching for a control channel in a multi-node system.

Related Art

Recently, an amount of data transfer of a wireless communication network has rapidly increased. The increase in the amount of data transfer attributes to machine-to-machine (M2M) communication and the advent and prevalence of various devices such as smartphones, tablet PCs, and the like, requiring a large amount of data transfer. In order to meet the required a large amount of data transfer, recently, carrier aggregation aimed at effective use of more frequency bands, cognitive radio technology, and multi-antenna technology and multi-base station cooperation technology aimed at increasing data capacity within a limited frequency, and the like have emerged.

A wireless communication network has evolved toward increasing density of accessible nodes around users. Here, nodes may refer to antennas or antenna groups spaced apart from a distributed antenna system by a predetermined interval or greater, or without being limited thereto, nodes may be used in a broader context. Namely, nodes may be a pico-cell base station (PeNB), a home base station (HeNB), a remote radio head (RRH), a remote radio unit (RRU), a repeater, and the like. A wireless communication system having high density of nodes may exhibit higher system performance through node cooperation. Namely, compared to a case in which nodes separately operate as base station (BS), an advanced BS (ABS), a node-B (NB), an eNode-B (eNB), an access point (AP), or the like, without cooperation, if nodes operate like antennas or antenna groups with respect to a single cell under administration of a single control station in their transmission and reception, far better system performance may be attained. Hereinafter, a wireless communication system including a plurality of nodes will be referred to as a multi-node system.

Nodes generally refer to an antenna group spaced apart by more than a predetermined interval from a distributed antenna system (DAS). But nodes may also be defined as a certain antenna group regardless of a distance to the DAS. For example, a base station including cross polarized antennas may be considered as a base station composed of a node configured as an H-pol antenna and a node configured as a V-pol antenna, and the present invention may be applied thereto Meanwhile, in a multi-node system, a new control channel may be used due to an inter-cell interference and shortage of capacity in existing control channels. Existing control channels may be decoded based on a cell-specific reference signal (CRS), while the new control channel may be decoded based on a user-specific reference signal.

Also, a new control channel may be allocated to a data region, among a control region and a data region of existing subframes. In this case, a new control channel may be allocated to a radio resource region to which two different resource allocation schemes such as non-interleaving and interleaving are applied.

In the multi-node system employing a new control channel, how a terminal (or a user equipment (UE)) searches for the new control channel may be an issue. Namely, how a radio resource region, namely, a search space, to be monitored to search for the new control channel is to be configured and which downlink control information (DCI) format is to be specifically searched in a configured search space may be an issue.

SUMMARY OF THE INVENTION

An aspect of the present invention provides a method and for searching for a control channel in a multi-node system and an apparatus using the same.

According to an aspect of the present invention, there is provided a method for searching for a control channel by a user equipment (UE) in a multi-node system, including: configuring a first common search space (CSS) and a second CSS, which are distinguishable, in a subframe including a plurality of orthogonal frequency division multiplexing (OFDM) symbols; and searching for control information from at least one of the first CSS and the second CSS, wherein first control information cyclic redundancy check (CRC)-scrambled with a radio network temporary identifier (RNTI) belonging to a first RNTI set is searched from the first CSS and second control information CRC-scrambled with an RNTI belonging to a second RNTI set is searched from the second CSS.

In another aspect, a user equipment (UE) searching for a control channel in a multi-node system may include: a radio frequency (RF) unit configured to transmit and receive a wireless signal; and a processor connected to the RF unit, wherein the processor configures a first common search space (CSS) and a second CSS, which are distinguishable, in a sub-frame including a plurality of orthogonal frequency division multiplexing (OFDM) symbols and searches for control information from at least one of the first CSS and the second CSS, such that the processor searches for first control information cyclic redundancy check (CRC)-scrambled with a radio network temporary identifier (RNTI) belonging to a first RNTI set, from the first CSS and second control information CRC-scrambled with an RNTI belonging to a second RNTI set, from the second CSS.

Advantageous Effects

According to embodiments of the present invention, a user equipment (UE) may set a search space in which an E-PDCCH is to be searched, and may know with which RNTI a CRC-scrambled DCI format is to be searched within the search space. Since the UE knows an RNTI to be searched in a search space and a DCI format combination, blind decoding overhead may be reduced.

DESCRIPTION OF EXEMPLARY EMBODIMENTS

A user equipment (UE) may be fixed or mobile, and may be called by other names such as mobile station (MS), mobile terminal (MT), user terminal (UT), subscriber station (SS), wireless device, personal digital assistant (PDA), wireless modem, handheld device, or the like.

A base station (BS) generally refers to a fixed station communicating with a UE and may be called by other names such as evolved-NodeB (eNB), base transceiver system (BTS), access point (AP), or the like.

Hereinafter, the present invention applied based on $3^{rd}$ generation partnership project (3GPP) long term evolution (LTE) based on 3GPP technical specification (TS) release 8 or 3GPP LTE-A based on 3GPP TS release 10 will be described. However, this is merely illustrative and the present invention may be applied to various wireless communication networks.

In order to enhance performance of a wireless communication system, technology is advancing toward increasing density of accessible nodes around users. In a wireless communication system having high density of nodes, cooperation between nodes may enhance performance of the system. A wireless communication system including nodes connected to and controlled by a base station (BS) in a wired manner or wirelessly will be referred to as a multi-node system.

Figure 1:
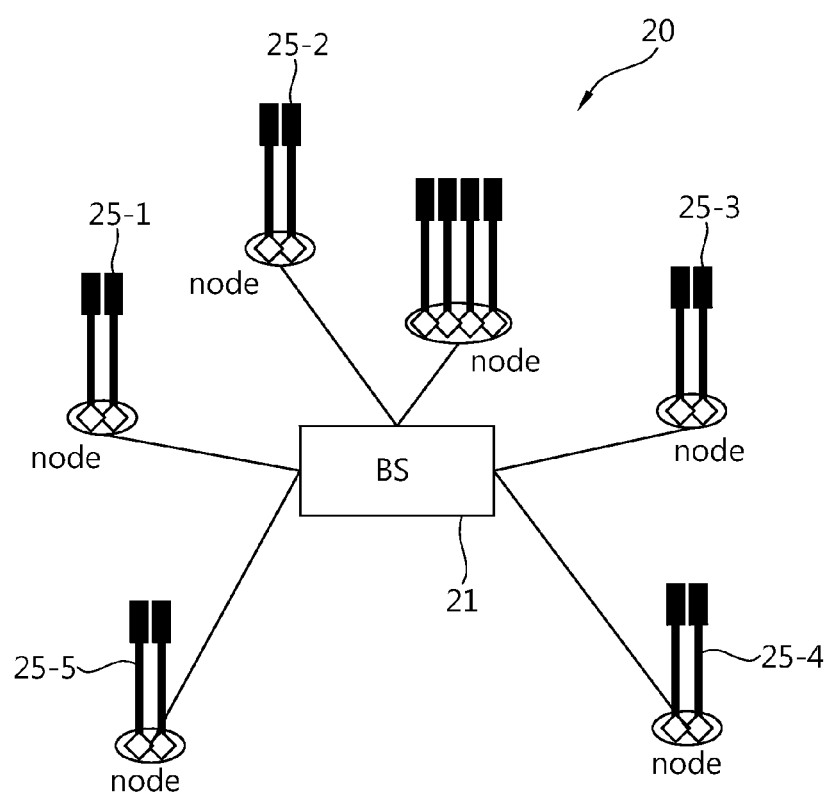
FIG. 1 is a view illustrating an example of a multi-node system.

FIG. 1 illustrates an example of a multi-node system.

Referring to FIG. 1, a multi-node system 20 may be composed of a single BS 21 and a plurality of nodes 25-1, 25-2, 25-3, 25-4, and 25-5. The plurality of nodes 25-1, 25-2, 25-3, 25-4, and 25-5 may be managed by the single BS 21. Namely, the plurality of nodes 25-1, 25-2, 25-3, 25-4, and 25-5 operate like a portion of a single cell. Each node may use the same cell ID, without a separate node ID, and may operate like a partial antenna group within a cell. In this case, the multi-node system 20 of FIG. 1 may be considered as a distributed multi-node system (DMNS) forming a single cell.

Also, the plurality of nodes 25-1, 25-2, 25-3, 25-4, and 25-5 may have a separate cell ID and perform scheduling and handover (HO) of a UE. In this case, the multi-node system 20 of FIG. 1 may be considered as a multi-cell system. The BS 21 may be a macro cell, and each node may be a femto cell or a pico cell having coverage smaller than that of a macro cell. When a plurality of cells are overlaid according to coverage, it may be called a multi-tier network.

In FIG. 1, each of the nodes 25-1, 25-2, 25-3, 25-4, and 25-5 may be any one of a BS, a node B, an eNode-B, a pico cell eNb (PeNB), a home eNB (HeNB), a radio remote head (RRH), a relay station (RS) or repeater, and a distributed antenna. At least one antenna may be installed in a node. Also, a node may be called a point. In the present disclosure, a node refers to an antenna group spaced apart from a DMNS by a predetermined interval. Namely, in the present disclosure, it is assumed that each node refers to an RRH physically. However, the present invention is not limited thereto and a node may be defined as a certain antenna group regardless of a physical interval. For example, it may be assumed that a BS including a plurality of cross-polarized antennas includes a node including horizontally polarized antennas and a node including vertically polarized antennas, and the present invention may be applied. Also, the present invention may also be applied to a case in which each node is a pico cell or a femto cell having cell coverage smaller than that of a macro cell, namely, to a multi-cell system. In the following description, an antenna may be replaced with an antenna port, a virtual antenna, an antenna group, or the like, as well as a physical antenna.

Figure 2:
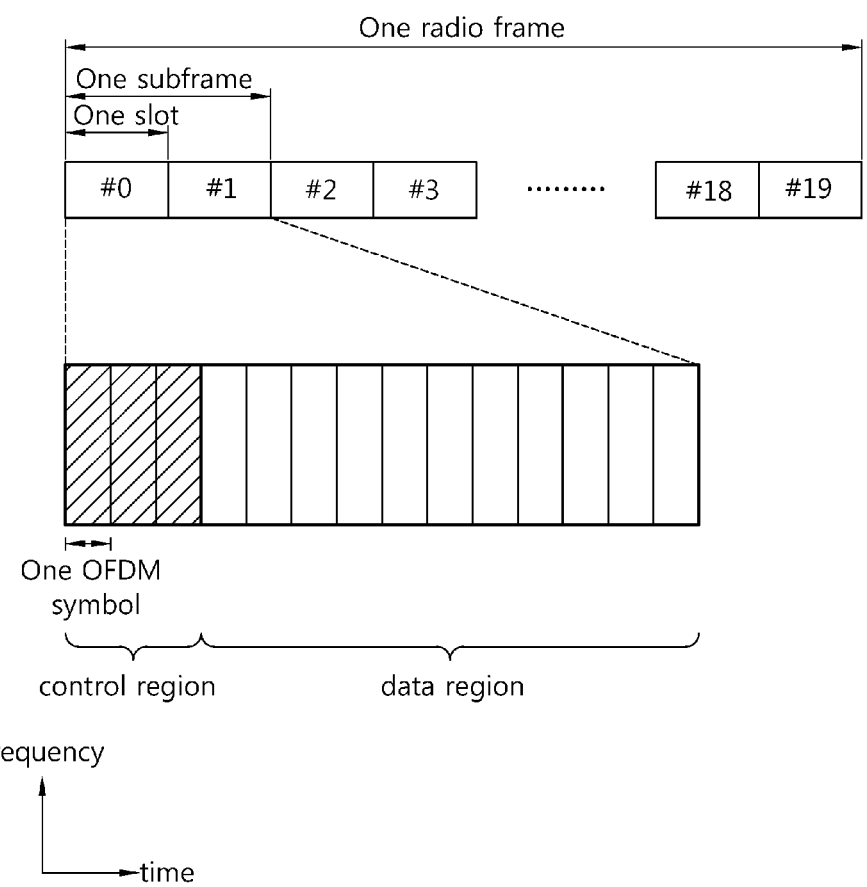
FIG. 2 is a view illustrating a structure of a downlink radio frame in 3 GPP LTE-A.

FIG. 2 is a view illustrating a structure of a downlink radio frame in 3GPP LTE-A. It may refer to paragraph 6 of 3GPP TS 36.211 V10.2.0 (2011-06) "Evolved Universal Terrestrial Radio Access (E-UTRA); Physical Channels and Modulation (Release 10)".

A radio frame includes ten subframes indexed by 0 to 9. A single frame includes two contiguous slots. A time take for a single subframe to be transmitted is a transmission time interface (TTI). A single subframe has a length of 1 ms, and a single slot has a length of 0.5 ms, for example.

A single slot may include a plurality of orthogonal frequency division multiplexing (OFDM) symbols in a time domain. An OFDM symbol is merely used to express a single symbol period in a time domain because 3GPP LTE uses an orthogonal frequency division multiple access (OFDMA) in downlink DL, so a multi-access scheme or a name thereof is not limited. For example, an OFDM symbol may be called by other name such as a single carrier-frequency division multiple access (SC-FDMA) symbol, a symbol period, or the like.

Figure 3:
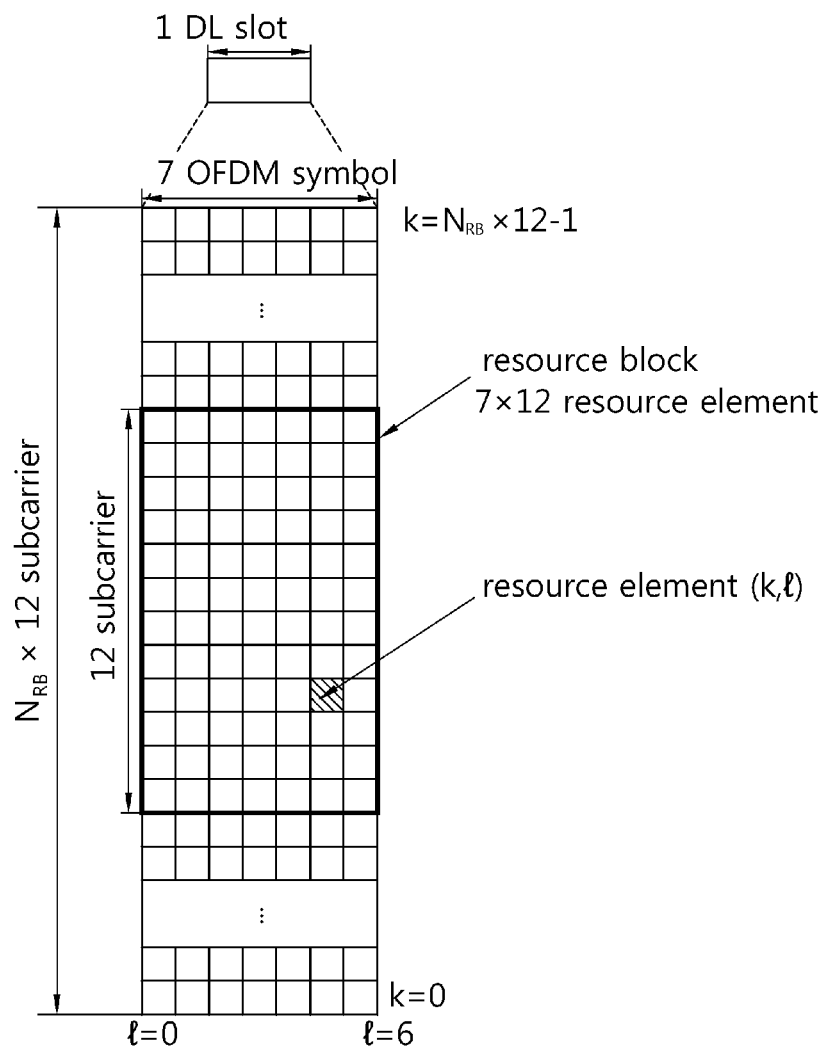
FIG. 3 is a view illustrating an example of a resource grid with respect to a single downlink slot.

FIG. 3 is a view illustrating an example of a resource grid with respect to a single downlink slot.

A downlink slot includes a plurality of OFDM symbols in a time domain and $N_{RB}$ number of resource blocks in a frequency domain. The $N_{RB}$ number of resource blocks included in the downlink slot is dependent upon a downlink transmission bandwidth set in a cell. For example, in an LTE system, $N_{RB}$ may be any one of 6 to 110. A single resource block includes a plurality of subcarriers in the frequency domain. A structure of an uplink slot may be identical to that of the downlink slot.

Each element of a resource grid is called a resource element. The resource elements of the resource grid can be identified by a pair of indices (k,l) in the slot. Here, k (k= 0, . . . , $N_R$×12-1) is a subcarrier index in the frequency domain, and l (l=0, . . . , 6) is an OFDM symbol index in the time domain.

Here, it is illustrated that one resource block includes 7×12 resource elements composed of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on a length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in a single OFDM symbol.

A downlink (DL) subframe used in downlink is divided into a control region and a data region in the time domain. The control region includes a maximum of four OFDM symbols before a first slot in a subframe, but the number of OFDM symbol included in the control region may vary. A physical downlink control channel (PDCCH) and other control channels are allocated to the control region, and a PDSCH is allocated to the data region.

As presented in 3GPP TS 36.211 V10.2.0, in 3GPP LTE/LTE-A, physical channels may be divided into physical downlink shared channel (PDSCH) and a physical uplink shared channel (PUSCH) as data channels, and physical downlink control channel (PDCCH), a physical control format indicator channel (PCFICH), a physical hybrid-ARQ indicator channel (PHICH), and a physical uplink control channel (PUCCH) as control channels.

The PCFICH transmitted in a first OFDM symbol of a subframe carries a control format indicator (CFI) regarding the number (namely, a size of a control region) of OFDM symbols used to transmit control channels. A UE first receives the CFI on a PCFICH and subsequently monitors a PDCCH. Unlike the PDCCH, a PCFICH is transmitted through fixed PCFICH resource of a subframe, without using blind decoding.

The PHICH carries an ACK (positive-acknowledgement)/NACK (negative-acknowledgement) signal for an uplink hybrid automatic repeat request (HARQ). An ACK/NACK signal with respect to UL data on a PUSCH transmitted by a UE is transmitted on the PHICH.

A physical broadcast channel (PBCH) is transmitted in first four OFDM symbols of a second slot of a first subframe of a radio frame. The PBCH carries system information essential for the UE to communicate with a BS, and system information transmitted through the PBCH is called a master information block (MIB). In comparison therewith, system information transmitted on a PDSCH indicated by a PDCCH is called a system information block (SIB).

Control information transmitted through the PDCCH is called downlink control information (DCI). The DCI includes resource allocation of the PDSCH (it is also called a downlink (DL) grant), resource allocation of the PUSCH (it is also called uplink (UL) grant), an aggregation of transmission power control command with respect to individual UEs of a certain UE group and/or activation of voice over Internet protocol (VoIP). Various formats of DCI may exist. For example, DCI formats may include 0, 1, 1A/1B/1C/1D, 2, 2A/2B/2C, 3, 3A, 4, and the like. The DCI formats may refer to paragraph 5.3.3.1 of 3GPP TS. 36. 212. V10.3.0(2011-09).

The PDCCH is transmitted in OFDM symbols before a PDSCH start OFDM symbol. Namely, in a single subframe, the PDCCH and the PDSCH are time-division-multiplexed.

A BS determines a PDCCH format according to DCI to be transmitted to a UE, adds a CRC to the DCI, and subsequently masks a unique identifier (it is called a radio network temporary identifier (RNTI)) according to an owner or a purpose of the PDCCH to the CRC. Namely, an RNTI is masked to the CRC according to an owner or a purpose of the PDCCH. If the PDCCH is for a specific UE, a unique RNTI of the UE, for example, cell-RNTI (C-RNTI), may be masked to the CRC. If the PDCCH is for a paging message, a paging indication identifier, namely, a paging-RNTI (P-RNTI) may be masked to the CRC. If the PDCCH is for system information block (SIB), system information identifier, namely, system information (SI)-RNTI may be masked to the CRC. In order to indicate an random access response as a response with respect to transmission of a random access preamble of a UE, a random access (RA)-RNTI may be masked to the CRC. If the PDCCH is related to a transmission power control command of a PUSCH, a TCP-PUSCH-RNTI may be masked to the CRC, while if the PDCCH is related to a transmission power control command of a PUCCH, a TCP-PUCCH-RNTI may be masked to the CRC.

A process of processing a physical layer of the PDCCH includes 1) generating bits for the PDCCH, 2) performing scrambling on the bits by a scrambling sequence, 3) performing QPSK modulation on the scrambled bits, 4) layer-mapping and precoding QPSK-modulated symbols, and 5) mapping to resource elements.

<PDCCH Format>

A control region of a DL subframe includes a plurality of control channel elements (CCEs). A CCE is a logical allocation unit used to provide a coding rate according to a state of a radio channel to a PDCCH and corresponds to a plurality of resource element groups (REGs). A single REG includes four Res, and a single CCE includes nine REGs. In order to constitute a single PDCCH, {1, 2, 4, 8} number of CCEs may be used, and here, each of {1, 2, 4, 8} elements is called a CCE aggregation level. A format of a PDCCH and an available number bits of the PDCCH are determined according to correlation between a number of CCEs and a coding rate provided by the CCEs.

PDCCH formats are as follows.

TABLE 1

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Meanwhile, in 3GP LTE, in order to detect a PDCCH, blind decoding is used. Blind decoding may also be called blind detection. Blind decoding is a method of demasking a desired identifier in a CRC of a received PDCCH (which is called a candidate PDCCH) and checking a CRC error to determine whether the corresponding PDCCH is a control channel thereof or not.

In 3GPP LTE, in order to reduce burden due to blinding decoding, a search space is used. The search space may be a monitoring set of a CCD for a PDCCH. A UE monitors a PDCCH within a corresponding search space The search space is divided into a common search space (CSS) and a UE-specific search space (USS). The CSS, a space in which a PDCCH having common control information is searched, is composed of sixteen CCEs from CCE indices 0 to 15 and supports a PDCCH having CCE aggregation levels of {4, 8}. However, a PDCCH (DCI format 0, 1A) carrying UE-specific information may also be transmitted in the CCS. The USS supports a CCE aggregation level of {1, 2, 4, 8}.

Table 2 shows the number of PDCCH candidates monitored by a UE.

TABLE 2

| Search Space Type | Aggregation level L | Size [In CCEs] | Number of PDCCH candidates | DCI formats |
|---|---|---|---|---|
| UE-specific | 1 | 6 | 6 | 0, 1, 1A, 1B, |
|  | 2 | 12 | 6 | 1D, 2, 2A |
|  | 4 | 8 | 2 |  |
|  | 8 | 16 | 2 |  |
| Common | 4 | 16 | 4 | 0, 1A, 1C, |
|  | 8 | 16 | 2 | 3/3A |

Sizes of search spaces are determined as shown in Table 2, and start points of the common search space (CSS) and the UE-specific search space (USS) are defined to be different. A start point of the CSS is fixed regardless of a subframe, while a start point of the USS may vary for subframes according to a UE identifier (for example, C-RNTI), a CCE aggregation level, and/or a slot number of a radio frame. In a case in which a start point of a USS is within the CSS, the USS and the CSS may overlap.

In detail, in an aggregation level L∈{1, 2, 3, 4}, a search space $S^{(L)}_k$ is defined as an aggregation of PDCCH candidates. A CCE corresponding to a PDCCH candidate m of the search space $S^{(L)}_k$ is given as follows.

$$L \cdot \{(Y_k+m') \bmod \lfloor N_{CEE,k}/L \rfloor\}+i \quad \text{[Equation 1]}$$

Here, i=0, 1, . . . , L−1, m=0, . . . , $M^{(L)}$−1, and $N_{CCE,k}$ is a total number of CCEs available to be used for transmission of a PDCCH within a control region of a subframe k. The control region includes an aggregation of CCEs numbered from 0 to $N_{CEE,k}$−1. $M^{(L)}$ is a number of PDCCH candidates in a CCE aggregation level L in the given search space.

Meanwhile, the multi-node system may be a carrier aggregation system in which a plurality of serving cells are set up. A single serving cell may be configured only with downlink component carriers (DL CCs) or may be configured as a pair of DLCC and uplink component carrier (UL CC).

Also, a serving cell may be divided in to a primary cell and a secondary cell. The primary cell refers to a serving cell that may be used for a UE to initially access or reaccess a network and that is set up or re-set up for an RRC connection with a BS. The primary cell is defined by a pair of a DL CC and a UL CC. A PUCCH is transmitted through the primary cell. The secondary cell is a serving cell set up for a UE in addition to the primary cell.

In a carrier aggregation system in which a plurality of serving cells are supported, cross-carrier scheduling and non-cross carrier scheduling may be supported.

The cross-carrier scheduling is a scheduling method for allocating resource of PDSCH transmitted through a different component carrier through a PDCCH transmitted through a specific component carrier and/or resource of PUSCH transmitted through a different component carrier other than a component carrier basically linked to the specific component carrier. Namely, the PDCCH and the PDSCH may be transmitted through different DL CCs, and the PUSCH may be transmitted through a UL CC other than a UL CC basically linked to the DL CC through which the PDCCH including UL grant is transmitted.

The non-cross carrier scheduling is a scheduling method for allocating resource of PDSCH of the same component carrier through a PDCCH transmitted through a specific component carrier and allocating resource of PUSCH transmitted through a single component carrier linked to the specific component carrier.

In a system supporting the cross-carrier scheduling, a carrier indicator indicating through which DL CC/UL CC a PDSCH or a PUSCH to which the PDCCH provides control information is transmitted. A field including such a carrier indicator will be referred to as a carrier indication field (CIF) hereinafter. A BS may inform a UE about whether a CIF is included in DCI through a higher layer signal such as an RRC message to thus inform the UE whether cross-carrier scheduling is configured.

When the CIF is set for a UE, in Equation 1, m'=m+$M^{(L)}n_{cif}$ wherein $n_{cif}$ is a value of CIF. When a CIF is not set for a UE, in Equation 1, m'=m. In the common search space, $Y_k$ is set to 0 with respect to two aggregation levels L=1 and L=8. In a UE-specific search space of the aggregation level L, the variable $Y_k$ is defined as follows.

$$Y_k=(A \cdot Y_{k-1}) \bmod D \quad \text{[Equation 2]}$$

Here, $Y_{-1}=n_{RNTI} \neq 0$, A=39827, D=65537, k=floor($n_s/2$), and $n_s$ is a slot number of a radio frame.

A UE monitors a single common search space with the aggregation levels {4, 8} in a primary cell. A UE for which a CIF is not set monitors a USS with aggregation levels {1, 2, 4, 8} in each activated serving cell. A UE for which a CIF is set monitors one or more USS with each of the aggregation levels {1, 2, 4, 8} in one or more activated serving cells. In the primary cell, a CSS and a USS may overlap.

Meanwhile, various reference signals RSs are transmitted in a subframe. A cell-specific reference signal (CRS) may be received by every UE within a cell and may be transmitted in the entire downlink band. The CRS may be generated based on a cell ID. A UE-specific reference signal (URS) is transmitted in a subframe. While the CRS is transmitted in the entire region of a subframe, the URS is transmitted in a data region of a subframe and used to demodulate a corresponding PDSCH. The URS is also called a demodulation RS (DM-RS). The URS will be described.

With respect to antenna port 5, a URS sequence $r_{ns}(m)$ is defined as expressed by Equation 3.

$$r_{n_s}(m) = \frac{1}{\sqrt{2}}(1 - 2 \cdot c(2m)) + j\frac{1}{\sqrt{2}}(1 - 2 \cdot c(2m+1)), \quad \text{[Equation 3]}$$
$$m = 0, 1, \ldots, 12N^{PDSCH}_{RB} - 1$$

In Equation 3, $N^{PDSCH}_{RB}$ is a resource block unit indicating a frequency band of transmission of corresponding PDSCH.

A pseudo-random sequence c(i) is defined by a gold sequence having a length 31 as follows.

$c(n)=(x_1(n+Nc)+x_2(n+Nc))\mod 2$ $x_1(n+31)=(x_1(n+3)+x_1(n))\mod 2$ $x_2(n+31)=(x_2(n+3)+x_2(n+2)+x_2(n+1)+x_2(n))\mod 2$ [Equation 4]

The pseudo-random sequence is initiated to $c_{init}=(\lfloor n_s/2 \rfloor + 1) \cdot (2N_{ID}^{cell}+1) \cdot 2^{16}+n_{RNTI}$ in the beginning of each subframe. Here, $n_{RNTI}$ is a radio network temporary identifier.

Meanwhile, when an antenna port p is $\{7, 8, \ldots, v+6\}$, a URS sequence r(m) may be defined as expressed by Equation 5.

$$r(m) = \frac{1}{\sqrt{2}}(1-2\cdot c(2m)) + j\frac{1}{\sqrt{2}}(1-2\cdot c(2m+1)),$$ [Equation 5]

$$m = \begin{cases} 0, 1, \ldots, 12N_{RB}^{max,DL}-1 & \text{normal cyclic prefix} \\ 0, 1, \ldots, 16N_{RB}^{max,DL}-1 & \text{extended cyclic prefix} \end{cases}$$

The pseudo-random sequence is initialized to $c_{init}=(\lfloor n_s/2 \rfloor +1) \cdot (2N_{ID}^{cell}+1) \cdot 2^{16}+n_{SCID}$ in the beginning of each subframe. $n_{SCID}$ is given in the latest DCI format 2B or 2C related to PDSCH transmission with respect to antenna ports 7 and 8 as shown in Table 3.

TABLE 3

| Scrambling identity field in DCI format 2B or 2C | $n_{SCID}$ |
|---|---|
| 0 | 0 |
| 1 | 1 |

Without the DCI format 2B or 2C related to PDSCH transmission of antenna port 7 or 8, a UE assumes that $n_{SCID}$ is 0. With respect to antenna ports 9 to 14, a UE assumes that $n_{SCID}$ is 0.

The URS supports PDSCH transmission and is transmitted in antenna ports p=5, p=7, p=8 or p=7, 8, . . . , v+6. Here, v is a number of layers used for transmission of a PDSCH.

URSs may be transmitted to a single UE through antenna ports included in an aggregation S. S may be $\{7, 8, 11, 13\}$ or $\{9, 10, 12, 14\}$.

With respect to the antenna ports p=7, p=8, p=7, 8, . . . , v+6, physical resource blocks having a frequency region index $n_{PRB}$ are allocated for PDSCH transmission. A portion of a URS sequence r(m) is mapped to a complex value modulation symbol $a^{(p)}_{k,l}$ as expressed by Equation 6.

$$a^{(p)}_{k,l} = w_p(l') \cdot r(3 \cdot l' \cdot N_{RB}^{max,DL} + 3 \cdot n_{PRB} + m')$$ [Equation 6]

where, $$w_p(i) = \begin{cases} \bar{w}_p(i) & (m'+n_{PRB})\mod 2 = 0 \\ \bar{w}_p(3-i) & (m'+n_{PRB})\mod 2 = 1 \end{cases}$$

$k = 5m' + N_{sc}^{RB} n_{PRB} + k'$ $$k' = \begin{cases} 1 & p \in \{7, 8, 11, 13\} \\ 0 & p \in \{9, 10, 12, 14\} \end{cases}$$

$l =$ $$\begin{cases} l' \mod 2 + 2 & \text{if in a special subframe with configuration 3, 4, or 8} \\ l' \mod 2 + 3\lfloor l'/2 \rfloor & \text{if in a special subframe with configuration 1, 2, 6, or 7} \\ l' \mod 2 + 5 & \text{if not in a special subframe} \end{cases}$$

$$l' = \begin{cases} 0, 1, 2, 3 & \text{if } n_s \mod 2 = 0 \text{ and in a special subframe with configuration 1, 2, 6, or 7} \\ 0, 1 & \text{if } n_s \mod 2 = 0 \text{ and not in special subframe with configuration 1, 2, 6, or 7} \\ 2, 3 & \text{if } n_s \mod 2 = 1 \text{ and not in special subframe with configuration 1, 2, 6, or 7} \end{cases}$$

$m' = 0, 1, 2$

Sequence $\bar{w}_p(i)$ is given in a normal CP as shown in Table 5.

TABLE 4

| Antenna port p | $[\bar{w}_p(0)\ \bar{w}_p(1)\ \bar{w}_p(2)\ \bar{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

Namely, a configuration of a URS is determined by a cell ID, a scrambling ID, an antenna port, and the like.

Figure 4:
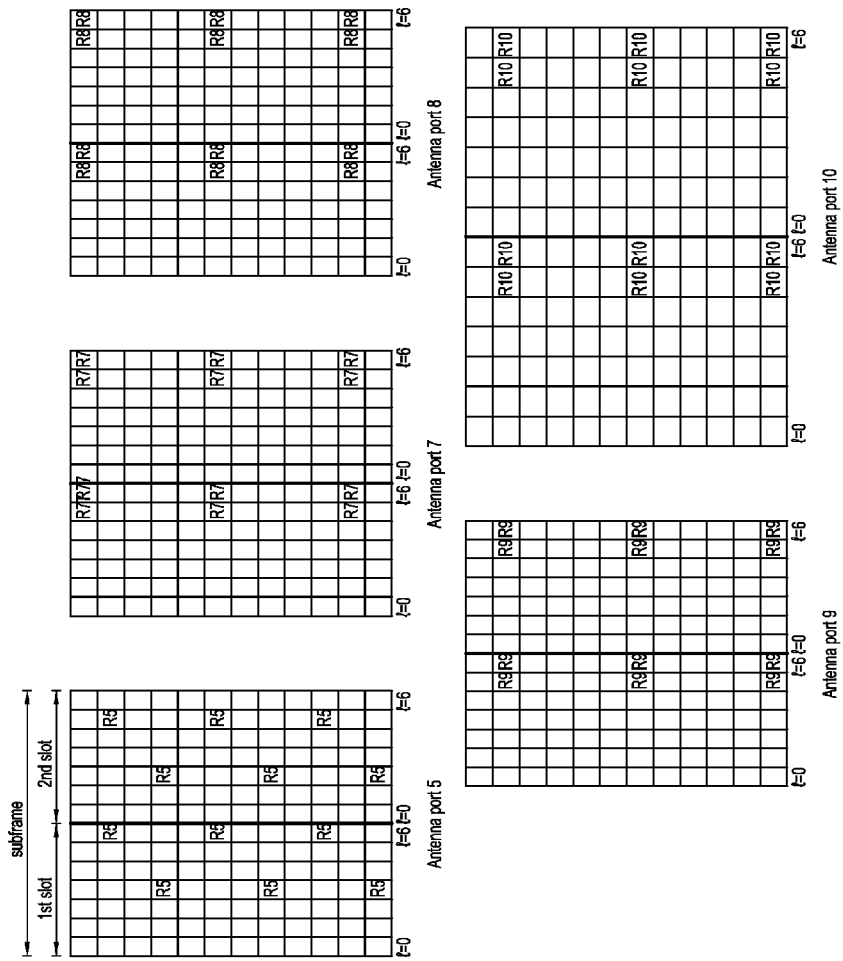
FIG. 4 is a view illustrating an example of RBs to which URS are mapped in which DM-RS is used as an example of a URS.

FIG. 4 is a view illustrating an example of an RB to which a URS is mapped. A DM-RS is taken as an example of a URS.

FIG. 4 illustrates resource elements used for a DM-RS in a normal CP structure. Rp is a resource element used for DM-RS transmission in an antenna port p. For example, R5 indicates a resource element in which a DM-RS with respect to an antenna port 5 is transmitted. Also, referring to FIG. 4, DM-RSs with respect to antenna ports 7 and 8 are transmitted through resource elements corresponding to first, sixth, and eleventh subcarriers (subcarrier indices 0, 5, 10) of sixth and seventh OFDM symbols (OFDM symbol indices 5, 6) of each slot. The DM-RSs with respect to the antenna ports 7 and 8 may be identified by an orthogonal sequence having a length 2. DM-RSs with respect to antenna ports 9 and 10 are transmitted through resource elements corresponding to second, seventh, and twelfth subcarriers (subcarrier indices 1, 6, 11) of sixth and seventh OFDM symbols (OFDM symbol indices 5, 6) of sixth and seventh OFDM symbols of each slot. DM-RSs with respect to the antenna ports 9 and 10 may be identified by an orthogonal sequence having a length 2. Also, since S=$\{7, 8, 11, 13\}$ or S=$\{9, 10, 12, 14\}$, DM-RSs with respect to the antenna ports 11 and 13 are mapped to resource elements to which the DM-RSs with respect to the antenna ports 7 and 8 are mapped, and DM-RSs with respect to the antenna ports 12 and 14 are mapped to resource elements to which the DM-RSs with respect to the antenna ports 9 and 10 are mapped.

Meanwhile, in a system of 3GPP Rel 11 or higher, an introduction of a multi-node system as illustrated in FIG. 1 having multiple connection nodes within a cell has been determined to improve performance. Also, standardization is in progress to apply various MIMO schemes and cooperative communication schemes that are under development or that may be applicable in the future.

Due to the introduction of nodes, an introduction of a new control channel to apply various cooperative communication schemes to a multi-node environment is requested. An enhanced-PDCCH (E-PDCCH) is a control channel discussed to be newly introduced due to the need.

Figure 5:
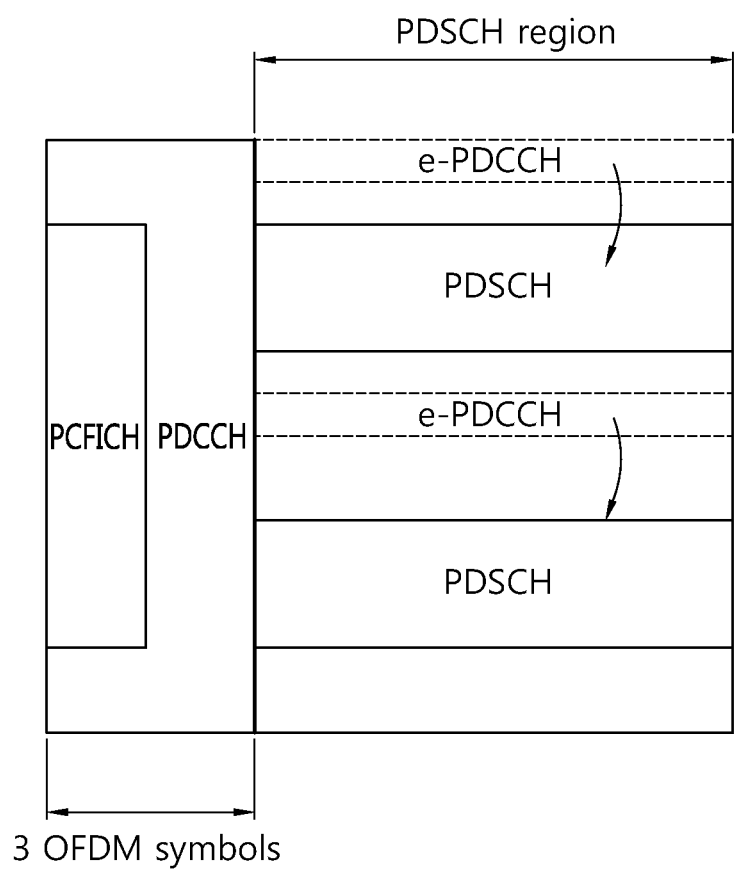
FIG. 5 is a view illustrating an example of an E-PDCCH.

FIG. 5 illustrates an example of an E-PDCCH.

An allocation position of the E-PDCCH may be within a data region (PDSCH region), rather than in an existing control region (PDCCH region). Control information with respect to nodes for each UE may be transmitted through the E-PDCCH, solving the problem of shortage of the existing PDCCH region.

The E-PDCCH may not be provided to UEs operating based on existing 3GPP Rel 8-10 and may be searched by UEs operating based on 3GPP Rel 11 or higher and a portion of the PDSCH region is allocated to use the E-PDCCH. For example, the E-PDCCH may be used by defining a portion of the PDSCH region in which data is generally transmitted as illustrated in FIG. 5. A UE may perform blind decoding in order to detect presence and absence of its E-PDCCH. The E-PDCCH may perform a scheduling operation identical to that of the existing PDCCH, namely, a PDSCH or PUSCH scheduling operation.

In a specific allocation scheme of the E-PDCCH, an existing R-PDCCH structure may be re-used. This is to minimize impact generated in case of altering the existing standard.

Figure 6:
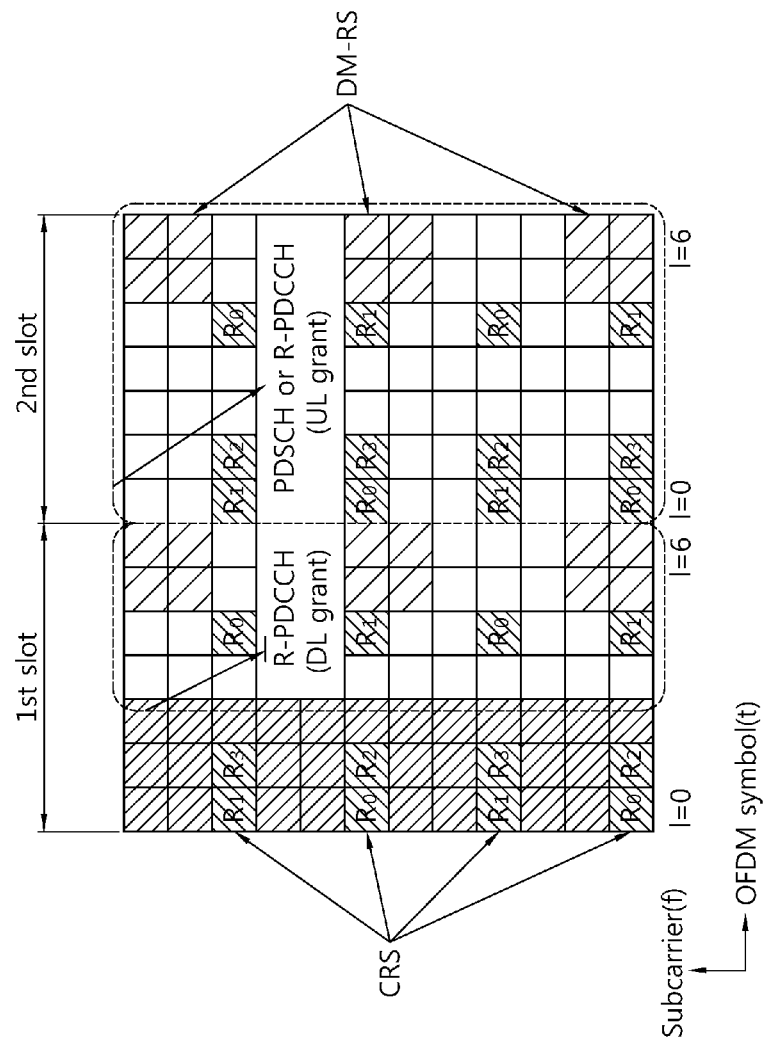
FIG. 6 is a view illustrating an example of an existing R-PDCCH.

FIG. 6 is a view illustrating an existing R-PDCCH.

In a frequency division duplex (FDD) system, only DL grant may be allocated to a first slot of a resource block and UL grant or data (PDSCH) may be allocated to a second slot of the resource block. In this case, R-PDCCH is allocated to data RE excluding all of the PDCCH region, a CRS, and a URS. For R-PDCCH demodulation, both a URS and a CRS may be used as illustrated in Table 5.

In case of using a URS, the antenna port 7 and scrambling ID=0 are used. Meanwhile, in case of using a CRS, the antenna port 0 may be used only when only a single PBCH transmission antenna is provided, and in a case in which two or four PBCH transmission antennas are provided, a mode is changed to a transmission diversity mode and both antenna ports {0 to 1} and {0 to 3} may be used.

The DL grant refers to DCI formats for transmitting DL control information of a UE, for example, DCI formats 1, 1A, 1B, 1C, 1D, 2, 2A, and the like. The UL grant refers to DCI formats including control information related to uplink transmission of a UE, for example, DCI formats 0 and 4.

The DL grant and the UL grant to be searched are divided by slots in a subframe. Thus, a UE configures a search space in the first slot and performs blind decoding for searching DL grant, and performs blind decoding for searching the UL grant in the configured search space in the second slot.

In LTE, downlink transmission modes 1 to 9 and uplink transmission modes 1 and 2 exist. A single transmission mode is set for each UE through higher layer signaling. In the downlink transmission modes, two DCI formats to be searched by each UE exist for each set mode. Meanwhile, in uplink transmission modes, one or two DCI formats are to be searched by each UE for each set mode. For example, in uplink transmission mode 1, the DCI format 0 corresponds to UL grant, and in uplink transmission mode 2, DCI formats 0 and 4 correspond to UL grant.

In case of FIG. 7, the number of times of blind decoding to be performed by a UE to detect its E-PDCCH in a search space configured for each slot is as follows.

DL grant: (number of PDCCH candidates)×(number of DCI formats with respect to DL transmission modes)=16×2=32

UL grant: (number of PDCCH candidates in UL transmission mode 1)×(number of DCI formats in UL transmission mode 1)=16×1=16 or (number of PDCCH candidates in UL transmission mode 2)×(number of DCI formats in UL transmission mode 2)=16×2=32

Thus, total number of times of blind decoding obtained by adding the number of times of blind decoding in the first slot and the number of times of blind decoding in the second slot is 32+16=48 in the uplink transmission mode 1 and 32+32=64 in the uplink transmission mode 2.

Figure 8:
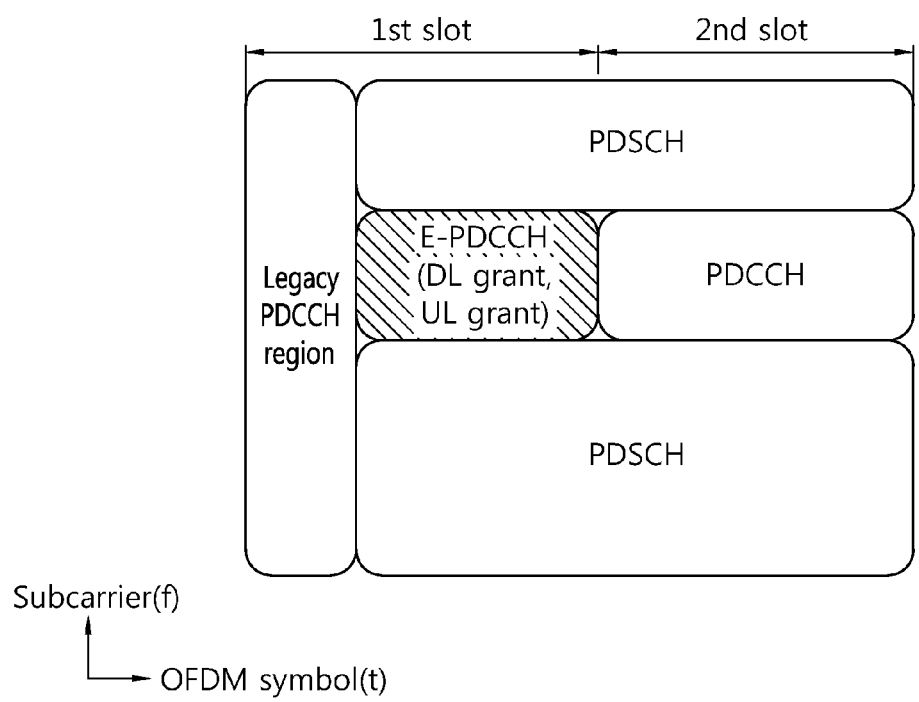
FIG. 8 is a view illustrating an example of simultaneously allocating a DL grant and UL grant to a first slot.

FIG. 8 is a view illustrating an example of simultaneously allocating a DL grant and UL grant to a first slot. It is assumed that an E-PDCCH is configured only in a first slot of a subframe.

TABLE 5

| Transmission mode | DCI format | Transmission scheme of PDSCH corresponding to R-PDCCH |
|---|---|---|
| Mode 8 | DCI format 1A | In a case that R-PDCCH is demodulated based on URS: Single antenna port: Antenna port 7 and $n_{SCID}$ = 0 is used. In a case that R-PDCCH is demodulated based on CRS: If a single PBCH antenna port is provided, a single antenna port, namely, antenna port 0, is used. Otherwise, a transmit diversity is used. |
| | DCI format 2B | Dual-layer transmission by antenna ports 7 and 8; or a single antenna port by antenna port 7 or 8 |
| Mode 9 | DCI format 1A | In a case that R-PDCCH is demodulated based on URS: Single antenna port: Antenna port 7 and $n_{SCID}$ = 0 is used. In a case that R-PDCCH is demodulated based on CRS: If a single PBCH antenna port is provided, a single antenna port, namely, antenna port 0, is used. Otherwise, a transmit diversity is used. |
| | DCI format 2C | Up to 4 layer transmission: antenna ports 7 to 10 |

<Operation Method of E-PDCCH>.

Figure 7:
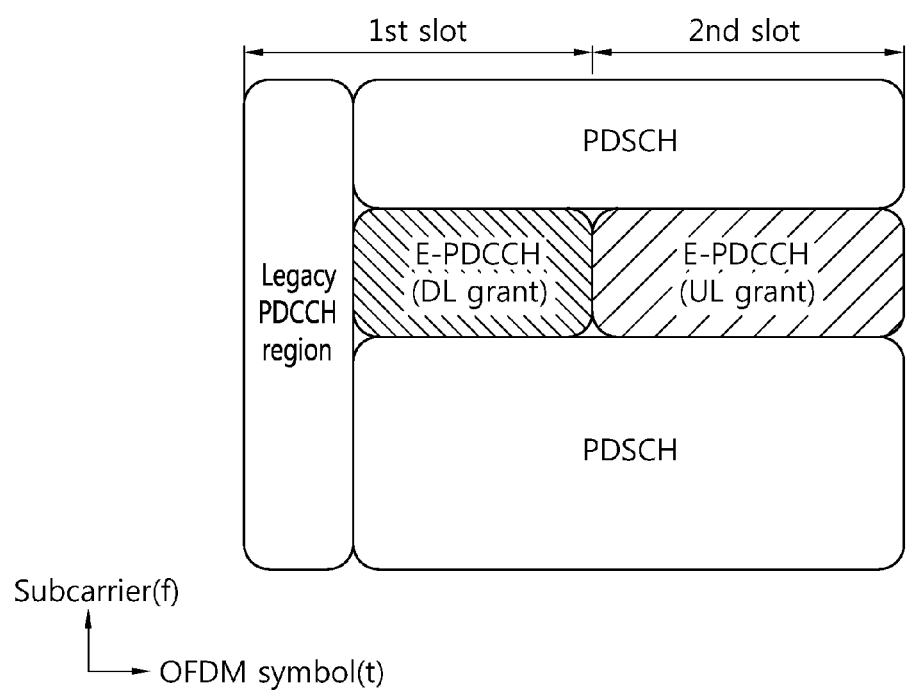
FIG. 7 is a view illustrating an example of separately allocating DL grant and a UL grant by slots.

FIG. 7 is a view illustrating an example of separately allocating DL grant and a UL grant by slots. It is assumed that an E-PDCCH is configured in both a first slot and a second slot of a subframe.

Referring to FIG. 7, DL grant is allocated to a first slot of a subframe, and UL grant is allocated to a second slot of the subframe.

Referring to FIG. 8, in case of allocating an E-PDCCH, both DL grant and UL grant may be simultaneously allocated to a first slot of a subframe. Thus, both the DL grant and the UL grant exist in the E-PDCCH of the first slot. A UE performs blind decoding to detect DL grant and UL grant only in the first slot of the subframe.

In LTE, DCI formats to be detected according to a transmission mode set for each U are determined. In particular, a total of 2 DCI formats may be detected in each DL transmission mode, and every DL transmission mode basically includes a DCI format 1A to support a fall-back mode.

In the UL grant, a DCI format 0 has a length identical to that of a DCI format 1A and may be discriminated by a 1-bit flag. Thus, additional blind decoding is not performed. However, in case of a DCI format 4, one of the remaining formats of the UL grant, additional blind decoding needs to be performed.

In FIG. 8, a number of times of blind decoding to be performed for a UE to search for its E-PDCCH in a search space is as follows.

In case of DL grant: (number of PDCCH candidates)×(number of DCI formats with respect to each DL transmission mode)=16×2=32

UL grant: (number of PDCCH candidates in UL transmission mode 1)×(number of DCI formats in UL transmission mode)=0 or (number of PDCCH candidates in UL transmission mode 2)×(number of DCI formats in UL transmission mode 2)=16×1=16

Thus, a total number of times of blinding decoding is 32+0-32 in UL transmission mode 1 and 32+16=48 in UL transmission mode.

<Cross Interleaving of E-PDCCH)

Similar to R-PDCCH, cross-interleaving (hereinafter, referred to as 'interleaving') may also be applied to the E-PDCCH. In a state in which a common PRB aggregation common to a plurality of UEs is set, E-PDCCHs of the plurality of UEs may be interleaved in frequency domain or time domain.

Figure 9:
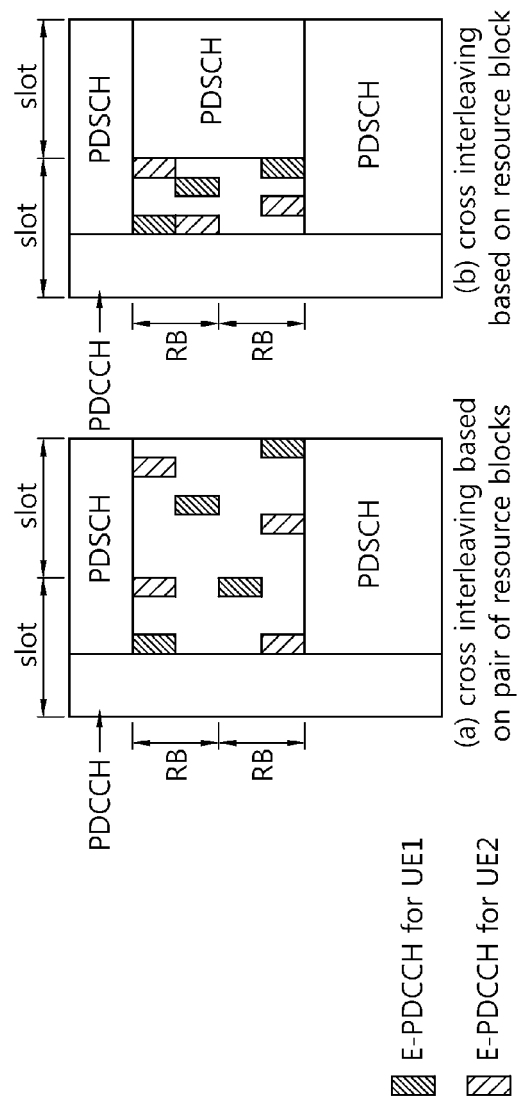
FIG. 9 is a view illustrating examples of interleaving E-PDCCH.

FIG. 9 is a view illustrating examples of interleaving E-PDCCH.

FIG. 9(*a*) is a view illustrating an example of performing cross interleaving based on a pair of resource blocks, and FIG. 9(*b*) illustrates an example of performing cross interleaving based on resource blocks.

As illustrated in FIG. 9, a plurality of E-PDCCHs with respect to a plurality of UEs may be distributedly allocated in a time domain and a frequency domain. When the cross interleaving is used, frequency/time diversity may be obtained in a plurality of resource blocks, obtaining a diversity gain.

Unlike a CRS-based PDCCH, a URS-based PDCCH (namely, the foregoing PDCCH) may be decoded through a URS generated based on different antenna ports and sequences for each UE.

Meanwhile, an E-PDCCH may be mapped to radio resource such that it is cross-interleaved or may be mapped to radio resource such that it is not cross-interleaved. The non-interleaving is a scheme in which radio resource is locally allocated, and the cross interleaving may be a scheme in which radio resource is distributedly allocated. Hereinafter, a region in which the cross-interleaved E-PDCCH is not allocated will be referred to as an interleaving region and a region in which the non-interleaved E-PDCCH is allocated will be referred to as a non-interleaving region.

The interleaving region and non-interleaving region may be determined by using a physical resource block (PRB), a virtual resource block (VRB), or a slot as an allocation unit. The VRB has a size identical to that of the PRB and is discriminated by a logical index. Alternatively, each of the interleaving region and the non-interleaving region may be determined by using a resource block obtained by dividing the PRB and the VRB, as an allocation unit. Namely, a new allocation unit different from that of an existing resource block may be used.

In the non-interleaving region, an allocation unit may be used according to an aggregation level of an E-PDCCH. For example, when an allocation unit in the non-interleaving region is a slot, an aggregation level {1, 2, 4, 8} may mean that an E-PDCCH may be composed of 1, 2, 4, or 8 slots.

Similarly, when an allocation unit is a partial resource block obtained by dividing a resource block into N parts, an aggregation level of an E-PDCCH indicates a number of partial resources that may constitute an E-PDCCH. When an aggregation level is {1, 2, 4, 8}, the E-PDCCH may be composed of 1, 2, 4, or 8 partial resource blocks. Here, for example, N may be 4. In this case, when the aggregation level is greater than 4, one more resource block may be used.

In the case in which an E-PDCCH is allocated by using partial resource blocks obtained by dividing a resource block into N parts, as a unit, an aggregation level may be determined as a different aggregation rather than {1, 2, 4, 8}. For example, in case of N=4, an aggregation level may be defined as {1, 2, 4} or {1, 2, 3, 4}. In this manner, the aggregation level may be redefined to provide every aggregation level in a single resource block.

In the interleaving region, the smallest aggregation level of an E-PDCCH may be composed of a minimum of two resource blocks, slots, or the foregoing partial resource blocks.

Hereinafter, a method for configuring a search space in an E-PDCCH and a method for searching for an E-PDCCH by a UE will be described.

An E-PDCCH is a control channel transmitted in a PDSCH region as described above. A resource region in which an E-PDCCH is transmitted will be referred to as an E-PDCCH region. The E-PDCCH region may be divided into a region in which cross-interleaving is applied (hereinafter, referred to as an 'interleaving region') and a region in which cross-interleaving is not applied (hereinafter, referred to as a 'non-interleaving region').

A method for configuring a search space in the interleaving region and the non-interleaving region and a method for searching for an E-PDCCH according to an RNTI and a DCI format in a configured search space will be described.

Hereinafter, for the purposes of description, a CSS and a USS in an existing PDCCH region will be referred to as a first CSS and a first USS.

Figure 10:
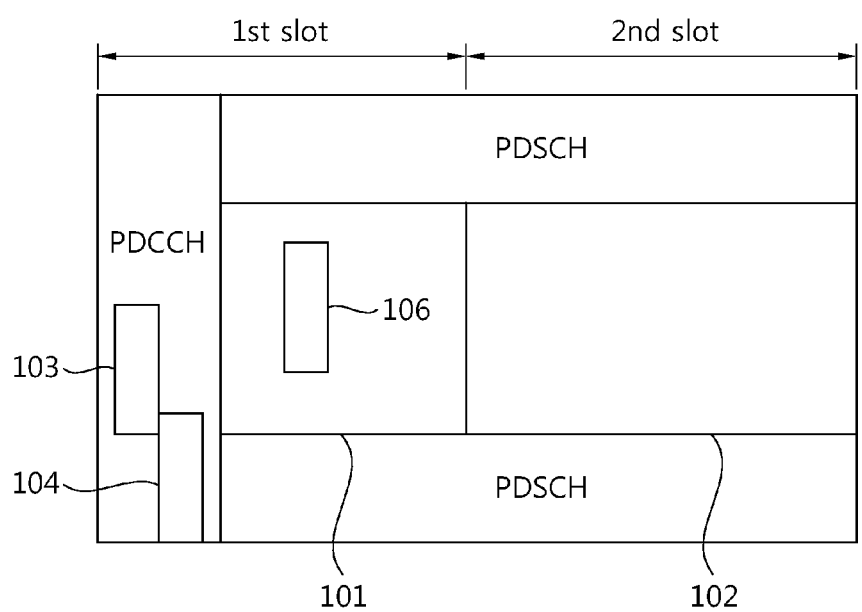
FIG. 10 is a view illustrating a method of configuring a search space according to an embodiment of the present invention.

FIG. 10 is a view illustrating a method of configuring a search space according to an embodiment of the present invention.

Referring to FIG. 10, E-PDCCH regions 101 and 120 may include an interleaving region 101 and a non-interleaving region 102 discriminated by slots. A BS may configure a second CSS 106 differentiated from the first CSS within the E-PDCCH regions 101 and 120. For example, the second CSS 106 may be configured in the interleaving region 101 among the E-PDCCH regions.

Figure 11:
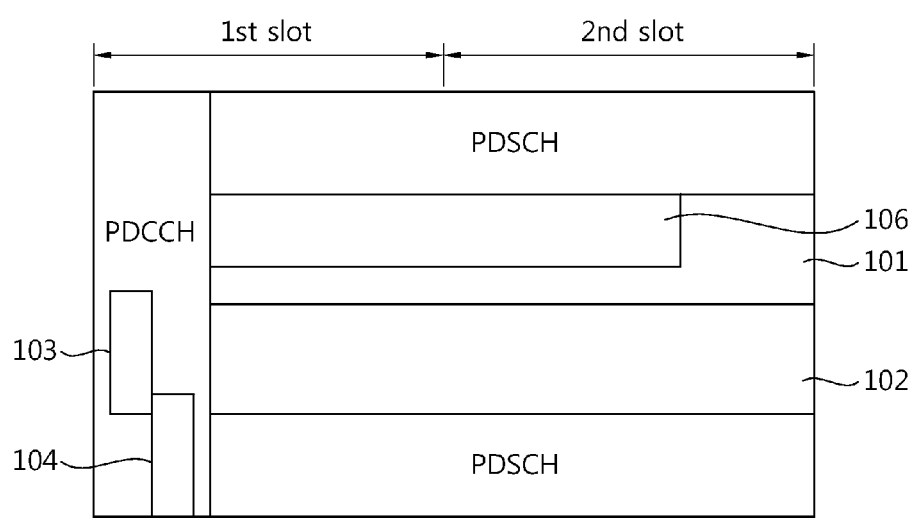
FIG. 11 is a view illustrating a modified example of FIG. 10.

FIG. 11 is a view illustrating a modified example of FIG. 10.

Referring to FIG. 11, the E-PDCCH regions 101 and 120 may include an interleaving region 101 and a non-interleaving region 102 distinguishable in a frequency domain. A BS may set a second CSS 106 distinguishable from the first CSS within the E-PDCCH regions 101 and 102. For example, the second CSS 106 may be configured in the interleaving region 101 among the E-PDCCH regions.

FIGS. 10 and 11 are merely illustrative and a method for configuring the second CSS is not limited thereto.

In the subframe in which the second CSS is configured as illustrated in FIGS. 10 and 11, a UE may search the first CSS 103 for a PDCCH CRC-scrambled with some RNTIs among existing RNTIs used only in the first CSS and search the second CSS 106 for an E-PDCCH CRC-scrambled with the other remaining RNTIs. Namely, the PDCCH searched from the PDCCH region and the E-PDCCH searched from the E-PDCCH region may be CRC-scrambled with different RNTIs.

For example, RA-RNTI, P-RNTI, SI-RNTI, TPC_PUCCH-RNTI, and TPC_PUSCH-RNTI may be RNTIs used only in the first CSS of an existing system. In this case, the UE may search the first CSS for the PDCCH CRC-scrambled with RA-RNTI, P-RNTI, and SI-RNTI, and search the second CSS for the E-PDCCH CRC-scrambled with TPC_PUCCH-RNTI and TPC_PUSCH-RNTI.

In the multi-node system in which a plurality of nodes are included in a cell, a BS may know a node that is geographically close to a UE or a node having a good channel state. In this case, the BS may transmit a PDCCH with respect to a UE for which a node positioned in proximity thereto is not known, among UEs, or a PDCCH that is to be received by every UE within a cell, through the first CSS, and transmit an E-PDCCH with respect to a UE for which a node positioned in proximity thereto is known, through the second CSS.

In another example, the BS may transmit a PDCCH CRC-scrambled with the P-RNTI and the SI-RNTI, through the first CSS and transmit an E-PDCCH CRC-scrambled with RA-RNTI, TPC_PUCCH-RNTI, and TPC_PUSCH-RNTI, through the second CSS. This method may be applied when the BS that is able to know a node close to a UE that attempts random accessing transmits a random access response message through the second CSS with respect to the UE. The random access response message may be generated by using an RA-RNTI. In this case, the existing RA-RNTI may be defined in a manner of '1+t_id+10*f_id'. Namely, the existing RA-RNTI is defined by a time (t_id) and a frequency (f_id) at which the random access response message is transmitted. In the present invention, a new RA-RNTI may be generated to transmit the random access response message. For example, the new RA-RNTI may be generated based on an ID of a node positioned in proximity to the UE. The ID of the node may be known to the UE through a reference signal transmitted by the node. Namely, the UE may extract information such as an ID used for generating a reference signal sequence, an antenna port number of a reference signal, RS setting index, or the like, through a reference signal, and may calculate a RA-RNTI by at least one of the information.

Figure 12:
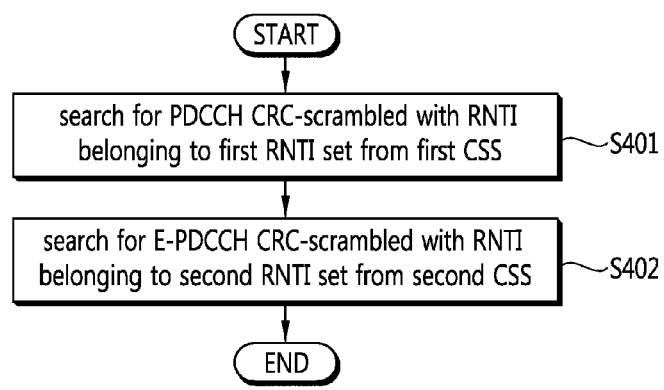
FIG. 12 is a flow chart illustrating a method of searching for a control channel by a terminal (or a user equipment (UE)) in a case in which a second CSS is configured as illustrated in FIGS. 10 and 11.

FIG. 12 is a flow chart illustrating a method of searching for a control channel by a UE in a case in which a second CSS is configured as illustrated in FIGS. 10 and 11.

Referring to FIG. 12, a UE searches for a PDCCH CRC-scrambled with an RNTI belonging to a first RNTI set from a first CSS (S401).

The UE searches an E-PDCCH CRC-scrambled with an RNTI belonging to a second RNTI set from a second CSS (S402). For example, the first RNTI aggregation may be {RA-RNTI, P-RNTI, SI-RNTI}, and an RNTI belonging to the second RNTI set may be {TPC_PUCCH-RNTI, TPC_PUSCH-RNTI}. Alternatively, the first RNTI set may be {P-RNTI, SI-RNTI}, and the second RNTI set may be {RA-RNTI, TPC_PUCCH-RNTI, TPC_PUSCH-RNTI}.

Figure 13:
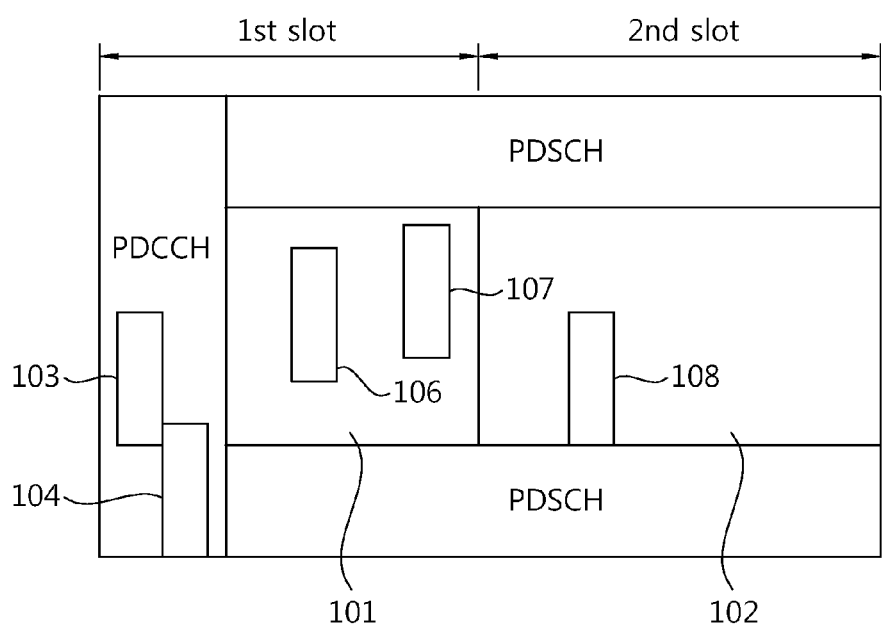
FIG. 13 is a view illustrating a method of configuring a search space according to another embodiment of the present invention.

FIG. 13 is a view illustrating a method of configuring a search space according to another embodiment of the present invention.

Compared with FIGS. 10 and 11, a second USS 107 and a third USS 108 are additionally configured in E-PDCCH regions 101 and 102. In a case in which the E-PDCCH regions include an interleaving region 101 and a non-interleaving region 102, the second USS 107 may be configured in the interleaving region 101 and the third USS 108 may be configured in the non-interleaving region 102.

Figure 14:
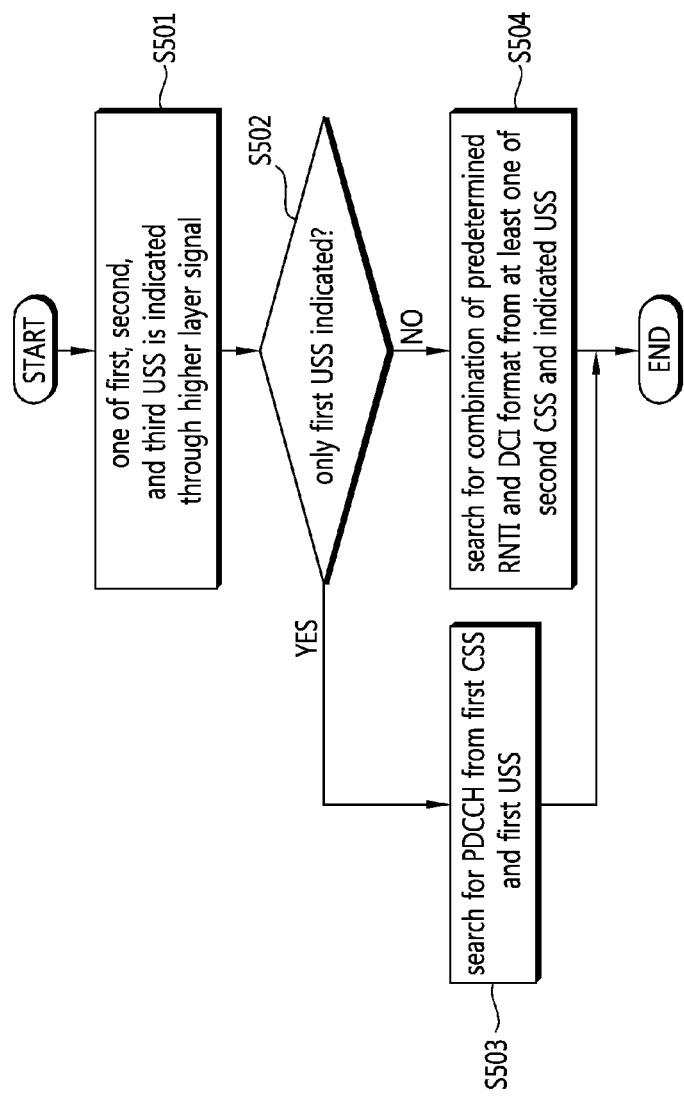
FIG. 14 is a flow chart illustrating a method for searching for a control channel by a UE in a case in which a second CSS and a plurality of USSs are configured as illustrated in FIG. 13.

FIG. 14 is a flow chart illustrating a method for searching for a control channel by a UE in a case in which a second CSS and a plurality of USSs are configured as illustrated in FIG. 13.

A UE may be informed from which of the first USS 104, the second USS 107, and the third USS 108 it should search for a control channel, through a higher layer signal (S501). The higher layer signal may be a radio resource control (RRC) message.

The UE determines whether only the first USS is indicated (S502), and when only the first USS has been indicated, the UE may search only the first CSS among the first CSS and the second CSS (S503). In this case, the UE may also search the first USS.

If at least one USS among the second USS and the third USS is indicated (S502), the UE search for a predetermined RNTI and DCI format combination from at least one of the second CSS and the indicated USS (S504).

For example, the UE may search for a specific RNTI and a DCI format an E-PDCCH among E-PDCCHs CRC-scrambled with an RNTI (for example, a C-RNTI), an SPS C-RNTI (a C-RNTI used for semi-static scheduling), a temporary C-RNTI (a temporary RNTI used in a random access process of a UE and having a length of 16 bits), from at least one of a second CSS and an indicated USS with respect to a specific RNTI and DCI format. Table 6 to Table 12 show examples of combinations of RNTI and DCI formats applicable to CRC demasking of an E-PDCCH in the second CSS and an indicated USS.

Table 6 shows an example in which the RNTI is a C-RNTI.

TABLE 6

| Transmission mode | DCI format | Search space |
|---|---|---|
| Mode 1 | DCI format 0 | Second CSS and indicated USS |
| Mode 2 | DCI format 0 | Second CSS and indicated USS |
|  | DCI format 4 | Indicated USS |

Table 7 shows an example of a DCI format that a UE searches in the second CSS and an indicated USS during a random access process.

TABLE 7

| DCI format | Search space |
|---|---|
| DCI format 1A | Second CSS and indicated USS |

Table 8 shows a case in which the RNTI is an SPS C-RNTI.

TABLE 8

| Transmission mode | DCI format | Search space |
|---|---|---|
| Mode 3 | DCI format 0 | Second CSS and indicated USS |

Table 9 shows a case in which the RNTI is a temporary C-RNTI for a PUSCH.

TABLE 9

| DCI format | Search space |
|---|---|
| DCI format 0 | Second CSS |

Table 10 shows a case in which the RNTI is a C-RNTI for a PDSCH.

TABLE 10

| Transmission mode | DCI format | Search space |
|---|---|---|
| Mode 1 | DCI format 1A | Second CSS and indicated USS |
|  | DCI format 1 | Second and/or third USS |
| Mode 2 | DCI format 1A | Second CSS and indicated USS |
|  | DCI format 2C | Second and/or third USS |

Table 11 shows a case in which the RNTI is an SPS C-RNTI.

TABLE 11

| Transmission mode | DCI format | Search space |
|---|---|---|
| Mode 3 | DCI format 1A | Second CSS and indicated USS |
|  | DCI format 1 | Second and/or third USS |
| Mode 4 | DCI format 1A | Second CSS and indicated USS |

Table 12 shows a case in which the RNTI is a temporary C-RNTI for a PDSCH.

TABLE 12

| DCI format | Search space |
|---|---|
| DCI format 1A | Second CSS and indicated USS |
| DCI format 1 | Indicated USS |

In the above examples, the UE which has detected an E-PDCCH from the second CSS and {second USS or third USS} may demodulate a PDSCH scheduled by the E-PDCCH by using a UE-specific RS (URS).

Figure 15:
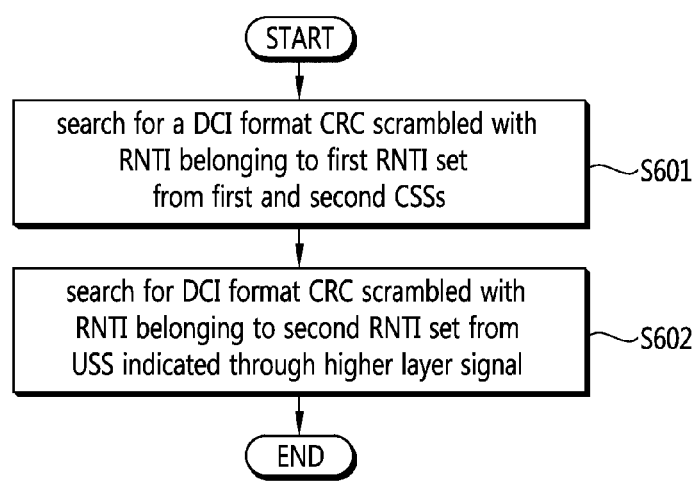
FIG. 15 is a flow chart illustrating an example of a method for searching for a DCI format by a UE.

FIG. 15 is a flow chart illustrating an example of a method for searching for a DCI format by a UE.

Referring to FIG. 15, a UE searches a DCI format CRC-scrambled with an RNTI belonging to a first RNTI set from a first CSS and a second CSS (S601). Namely, the UE may search a DCI format to be searched from the second CSS, also from the first CSS.

The UE searches only a DCI format CRC-scrambled with the RNTI belonging to the second RNTI set from the USS indicated through a higher layer signal (S602).

Namely, the UE searches a DCI format CRC-scrambled with an RNTI belonging to the same RNTI set in the first CSS and the second CSS, and searches a DCI format CRC-scrambled with a limited RNTI in the indicated USS.

Table 13 to Table 19 show examples of combinations of RNTIs and DCIs to be searched from {first CSS and second CSS} and indicated USS.

TABLE 13

| Transmission mode | DCI format | Search space |
|---|---|---|
| Mode 1 | DCI format 0 | First and second CSSs, and indicated USS |
| Mode 2 | DCI format 0 | First and second CSSs, and indicated USS |
|  | DCI format 4 | Indicated USS |

TABLE 14

| DCI format | Search space |
|---|---|
| DCI format 1A | First and second CSSs, and indicated USS |

TABLE 15

| Transmission mode | DCI format | Search space |
|---|---|---|
| Mode 3 | DCI format 0 | First and second CSSs, and indicated USS |

TABLE 16

| DCI format | Search space |
|---|---|
| DCI format 0 | First and second CSSs |

TABLE 17

| Transmission mode | DCI format | Search space |
|---|---|---|
| Mode 1 | DCI format 1A | First and second CSSs, and indicated USS |
|  | DCI format 1 | Indicated USS |
| Mode 2 | DCI format 1A | First and second CSSs, and indicated USS |
|  | DCI format 2C | Indicated USS |

TABLE 18

| Transmission mode | DCI format | Search space |
|---|---|---|
| Mode 3 | DCI format 1A | First and second CSSs, and indicated USS |
|  | DCI format 1 | indicated USS |
| Mode 4 | DCI format 1A | First and second CSSs, and indicated USS |

TABLE 19

| DCI format | Search space |
|---|---|
| DCI format 1A | First and second CSSs, and indicated USS |
| DCI format 1 | Indicated USS |

When a UE for searching a first CSS and a second CSS detects a PDCCH from the first CSS, the UE demodulates a corresponding PDSCH scheduled by the PDCCH by using a URS antenna port 7 and scrambling ID=0 in case of a multicast-broadcast signal frequency network subframe, and demodulates the corresponding PDSCH by using a CRC in case of a non-MBSFN subframe, namely, a general subframe. Meanwhile, when the E-PDCCH is detected from the second CSS, the UE may demodulate a corresponding PDSCH scheduled by the E-PDCCH, by using a URS.

In a case in which a UE moves within a cell including a plurality of nodes, a node close to the UE may be changed, and when a BS recognizes it, the BS reconfigures a serving node of the UE and reconfigures a configuration of the UE such that the UE may read an E-PDCCH with respect to corresponding node. This reconfiguration process is performed through an RRC message. Since the BS may transmit a PDCCH in the first CSS until when the reconfiguration of the UE is completed, data may be transmitted and received between the BS and the UE ceaselessly.

In the method described with reference to FIG. 15, a scheme of informing about which one of the first CSS and the second CSS the UE is to be searched through a higher layer signal or determining according to an RNTI and a DCI format may be used. For example, the BS may perform RRC signaling that the DCI format 1A in the PDCCH to be searched with a C-RNTI is transmitted through the first CSS or the second CSS. Alternatively, the DCI format 1A in the PDCCH to be searched with SPS C-RNTI between the BS and the UE may be determined to be transmitted through the first CSS in advance.

Figure 16:
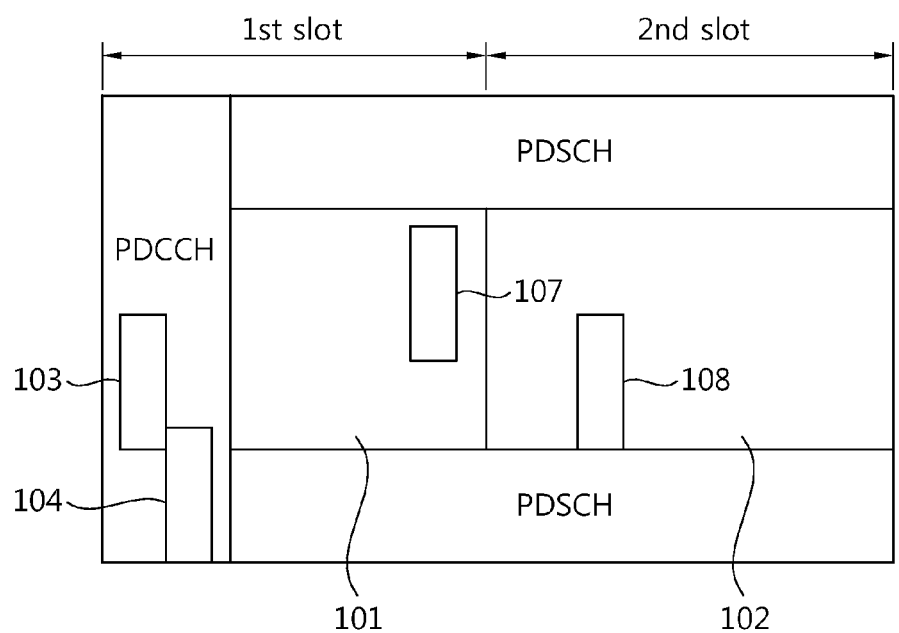
FIG. 16 is a view illustrating a method for configuring a search space according to another embodiment of the present invention.

FIG. 16 is a view illustrating a method for configuring a search space according to another embodiment of the present invention.

Unlike FIG. 13, in FIG. 16, only the second USS and the third USS may be added to the E-PDCCH. Namely, without configuring the second CSS, only the additional USS is configured. For example, the second USS may be configured in the interleaving region and the third USS may be configured in the non-interleaving region. The UE may be informed from which one of first, second, and third USSs, a PDCCH/E-PDCCH is to be searched, through an RRC message.

For example, the UE may be configured to search the first CSS and the second USS. In this case, the UE which has detected the PDCCH from the first CSS may demodulate a corresponding PDSCH scheduled by the PDCCH with a CRS in a non-MBSFN subframe and demodulate the corresponding PDSCH through a URS in an MBSFN subframe.

If the UE detects an E-PDCCH from the second USS, the UE may demodulate the corresponding PDSCH scheduled by the E-PDCCH by using the URS. The UE may also demodulate a PDSCH by using the URS which has been used for E-PDCCH demodulation.

Figure 17:
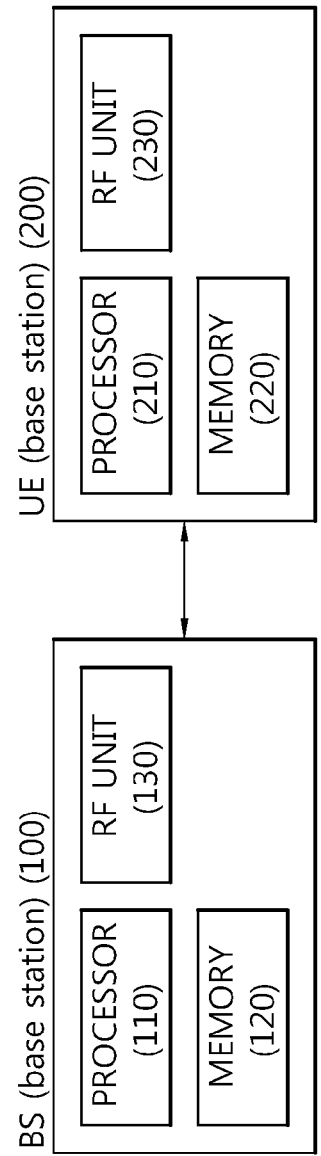
FIG. 17 is a block diagram illustrating a wireless device to which an embodiment of the present invention is applicable.

FIG. 17 is a block diagram illustrating a wireless device to which an embodiment of the present invention is applicable.

A BS 100 includes a processor 110, a memory 120, and a radio frequency (RF) unit 130. The processor 110 implements a proposed function and/or method. Layers of a radio interface protocol are implemented by the processor 110. The memory 120 is connected to the processor 110 and stores various types of information for driving the processor 110. The RF unit 130 is connected to the processor 110 and transmits and/or receives a radio signal.

A UE 200 includes a processor 210, a memory 220, and a radio frequency (RF) unit 230. The processor 210 implements a proposed function and/or method. Layers of a radio interface protocol may be implemented by the processor 210. The memory 220 is connected to the processor 210 and stores various types of information for driving the processor 210. The RF unit 230 is connected to the processor 210 and transmits and/or receives a radio signal.

The processors 110 and 210 includes may include an ASIC (Application-Specific Integrated Circuit), a chip set, a logical circuit, and/or a data processing device. The memories 120 and 220 may include a ROM (Read-Only Memory), a RAM (Random Access Memory), a flash memory, a memory card, a storage medium, and/or any other storage device. The RF units 130 and 230 may include a baseband circuit for processing a radio signal. When the embodiment is implemented by software, the foregoing techniques may be implemented as modules (processes, functions, and the like) performing the foregoing functions. The modules may be stored in the memories 120 and 220 and executed by the processors 110 and 210. The memories 120 and 220 may be provided within or outside the processors 110 and 120 and may be connected to the processors 110 and 210 through a well-known unit.

What is claimed is:

1. A method for searching for a control channel by a user equipment (UE) in a multi-node system, the method comprising:

configuring a first common search space (CSS) and a second CSS, which are distinguishable, in a subframe including a plurality of orthogonal frequency division multiplexing (OFDM) symbols;

searching for control information from at least one of the first CSS and the second CSS; and upon locating the control information, communicating with another device in accordance with the located control information, wherein first control information cyclic redundancy check (CRC)-scrambled with a radio network temporary identifier (RNTI) belonging to a first RNTI set is searched from the first CSS and second control information CRC-scrambled with an RNTI belonging to a second RNTI set is searched from the second CSS, wherein the first CSS is configured within a control region composed of a first N (N is a natural number of any one of 1 to 4) number of OFDM symbols in the subframe, and the second CSS is configured in a data region composed of the other remaining OFDM symbols of the subframe, wherein a resource region in which the second control information is received includes a non-interleaving region including local radio resources and an interleaving region including distributed radio resources, and the second CSS is set in the interleaving region, wherein a first UE-specific search space (USS), a second USS, and a third USS are additionally configured to search for control information specific to the UE, wherein the first USS is configured in the control region, the second USS is configured in the interleaving region, and the third USS is configured in the non-interleaving region, and wherein information indicating any one of the first USS, the second USS, and the third USS is received through a higher layer signal, and control information CRC-scrambled with a specific RNTI is searched from the USS indicated by the higher layer signal and the second CSS.

2. The method of claim 1, wherein the first control information is demodulated based on a cell-specific reference signal common to every UE, and the second control information is demodulated based on a UE-specific reference signal specific to the UE.

3. The method of claim 1, wherein the first RNTI set includes a random access RNTI (RA-RNTI) applied to a random access response message, a paging-RNTI (P-RNTI) applied to a paging message, and a system information RNTI (SI-RNTI) applied to system information, and the second RNTI set includes a TPC-PUCCH-RNTI applied to control information related to transmission power control command with respect to an uplink control channel and a TPC_PUSCH_RNTI applied to control information related to transmission power control command with respect to an uplink data channel.

4. A user equipment (UE) searching for a control channel in a multi-node system, the UE comprising:

a radio frequency (RF) unit configured to transmit and receive a wireless signal; and a processor connected to the RF unit, wherein the processor is configured to:

configured a first common search space (CSS) and a second CSS, which are distinguishable, in a subframe including a plurality of orthogonal frequency division multiplexing (OFDM) symbols; and search for control information from at least one of the first CSS and the second CSS, wherein first control information cyclic redundancy check (CRC)-scrambled with a radio network temporary identifier (RNTI) belonging to a first RNTI set is searched from the first CSS and second control information CRC-scrambled with an RNTI belonging to a second RNTI set is searched from the second CSS, upon locating the control information, communicate with another device in accordance with the located control information wherein the first CSS is configured within a control region composed of a first N (N is a natural number of any one of 1 to 4) number of OFDM symbols in the subframe, and the second CSS is configured in a data region composed of the other remaining OFDM symbols of the subframe, wherein a resource region in which the second control information is received includes a non-interleaving region including local radio resources and an interleaving region including distributed radio resources, and the second CSS is set in the interleaving region, wherein a first UE-specific search space (USS), a second USS, and a third USS are additionally configured to search for control information specific to the UE, wherein the first USS is configured in the control region, the second USS is configured in the interleaving region, and the third USS is configured in the non-interleaving region, and wherein information indicating any one of the first USS, the second USS, and the third USS is received through a higher layer signal, and control information CRC-scrambled with a specific RNTI is searched from the USS indicated by the higher layer signal and the second CSS.

5. The UE of claim 4, wherein the first control information is demodulated based on a cell-specific reference signal common to every UE, and the second control information is demodulated based on a UE-specific reference signal specific to the UE.

6. The UE of claim 4, wherein the first RNTI set includes a random access RNTI (RA-RNTI) applied to a random access response message, a paging-RNTI (P-RNTI) applied to a paging message, and a system information RNTI (SI-RNTI) applied to system information, and the second RNTI set includes a TPC-PUCCH-RNTI applied to control information related to transmission power control command with respect to an uplink control channel and a TPC_PUSCH_RNTI applied to control information related to transmission power control command with respect to an uplink data channel.

* * * * *